May 19, 1931.    B. M. FROMKNECHT    1,806,196
WAFFLE IRON
Filed July 20, 1929
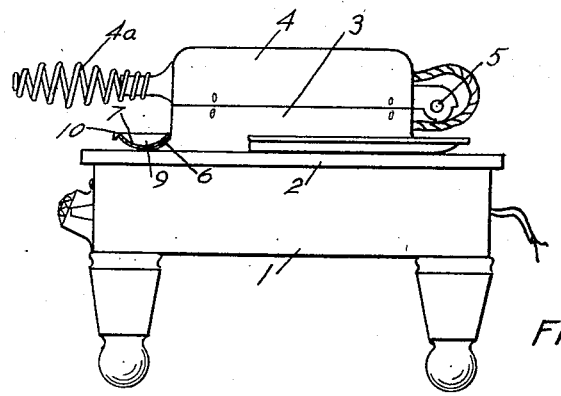
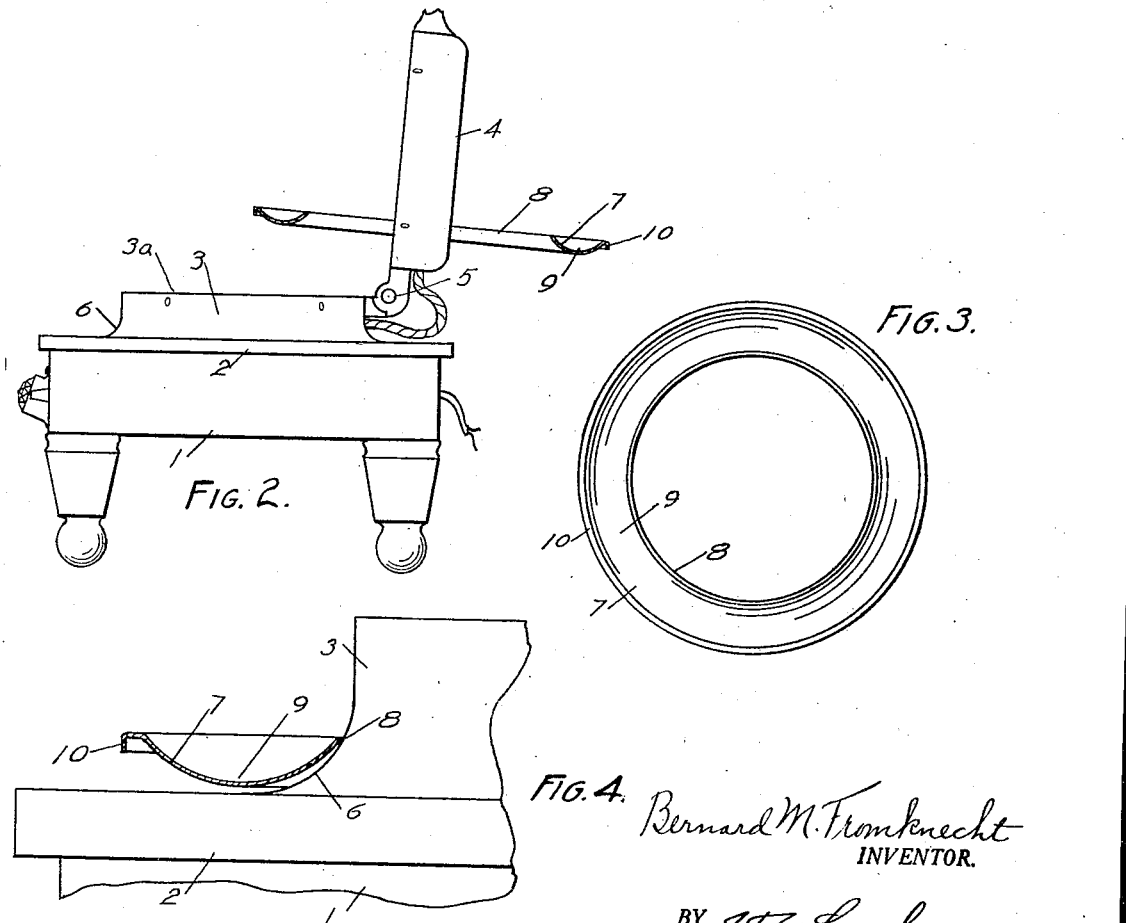

Patented May 19, 1931

1,806,196

UNITED STATES PATENT OFFICE

BERNARD M. FROMKNECHT, OF ERIE, PENNSYLVANIA, ASSIGNOR TO THE GRISWOLD MANUFACTURING COMPANY, OF ERIE, PENNSYLVANIA, A CORPORATION OF PENNSYLVANIA

WAFFLE IRON

Application filed July 20, 1929. Serial No. 379,612.

Many cooking devices involving a cooking plate are subjected to a certain amount of drip of batter, or material over the edges of the plate. This over-flow, or drip involves more or less cleaning of the sides of the cooking plate. The present invention is directed to a device to simplify the disposal of such drip, or over-flow. Features and details of the invention will appear more fully from the specification and claims.

A preferred embodiment of the invention is illustrated in the accompanying drawings as follows:

Fig. 1 shows an end view of a waffle iron with a drip catcher partly in place.

Fig. 2 a similar view showing the manner of assembling the drip catcher.

Fig. 3 a plan view of the drip catcher.

Fig. 4 an enlarged section of the cooking plate skirt and drip catcher.

1 marks the base of the waffle iron. This is provided with a cover plate 2 with an upstanding flange 3 on the top of which is arranged a cooking plate 3a. The waffle iron is provided with a top cooking element 4 which is hinged at 5 to the bottom element. The upper element is provided with the usual handle 4a by means of which the top cooking plate 4 may be raised. The skirt 3 is flaring at 6 and an annular drip catcher 7 has its inner periphery 8 such as to fit the flaring surface so that the periphery as a whole is slightly larger than the cooking plate and the top element. The catcher has a trough-shaped central portion 9 and is downwardly flanged at 10 so as to finish the outer edge and to stiffen the catcher.

In order to put the drip catcher in place, the top plate is raised and the catcher moved down over the plate and past the hinge and brought forward and dropped over the bottom skirt. The flaring edge of the skirt fitting the inner periphery makes a tight fit so as to prevent the leakage of any material between the drip catcher and the skirt. With any accumulation of such drip the drip catcher is lifted off with a reverse movement from that of assembly above described and cleaned by itself. The device makes a complete annular catcher and a very attractive and cheaply constructed device.

What I claim as new is:—

1. The combination of a cooking plate; an annular skirt extending downwardly and outwardly from the plate; and a detachable annular drip catcher fitting the wall of the skirt and forming a closure therewith.

2. The combination of a cooking plate; an annular and flaring skirt extending downwardly and outwardly from the plate; and a detachable annular drip catcher seating on the flaring surface of the wall of the skirt and forming a closure therewith.

3. In a waffle iron, the combination of a bottom plate; an annular skirt extending downwardly and outwardly from said plate; an upper plate hinged on the bottom plate and having a handle thereon; and a detachable drip catcher adapted to be moved over the top plate and the hinge and assembled on and fitting the skirt.

4. In a waffle iron, the combination of a bottom plate; an annular and flaring skirt extending downwardly and outwardly from said plate; an upper plate hinged on the bottom plate and having a handle thereon; and a detachable drip catcher adapted to be moved over the top plate and the hinge and assembled and seated on the flaring surface of the skirt.

In testimony whereof I have hereunto set my hand.

BERNARD M. FROMKNECHT.